F. B. COOK.
PROCESS OF MAKING SPRING JACKS.
APPLICATION FILED JAN. 15, 1915.
1,161,193.
Patented Nov. 23, 1915.
2 SHEETS—SHEET 1.
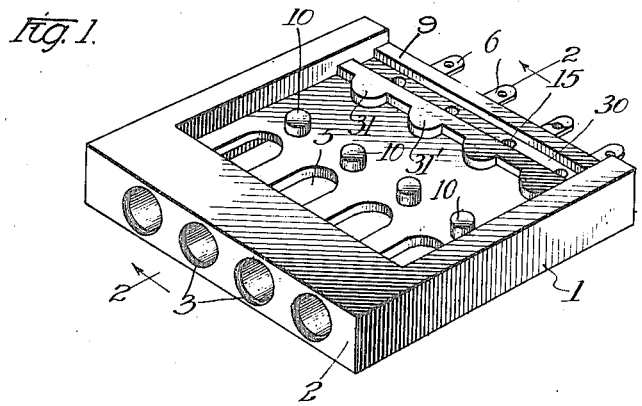
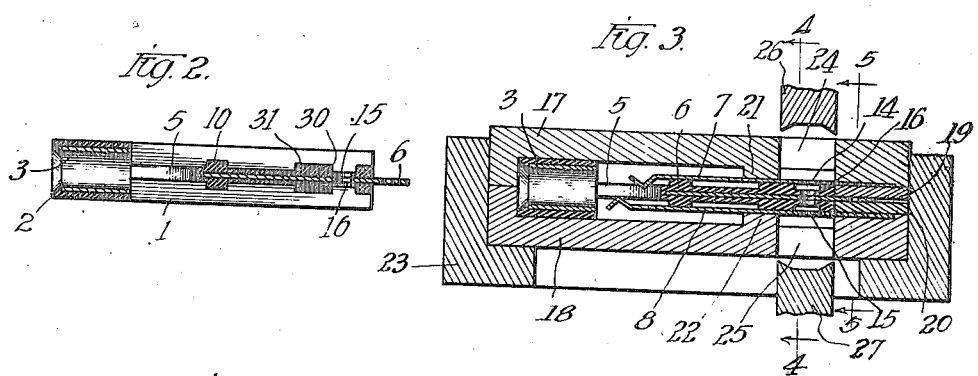
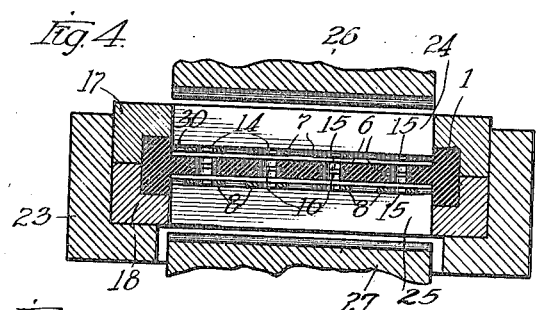
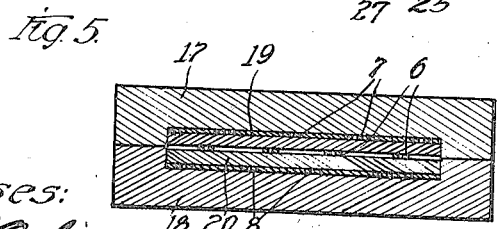
Witnesses:
Inventor
Frank B. Cook
By G. L. Cragg
atty.

F. B. COOK.
PROCESS OF MAKING SPRING JACKS.
APPLICATION FILED JAN. 15, 1915.
1,161,193.
Patented Nov. 23, 1915.
2 SHEETS—SHEET 2.
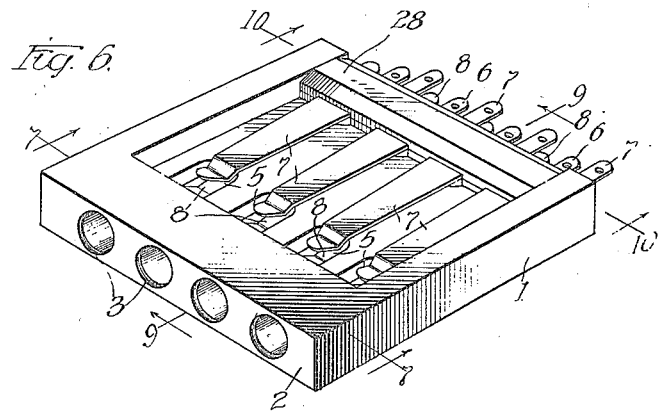
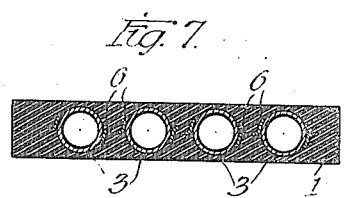
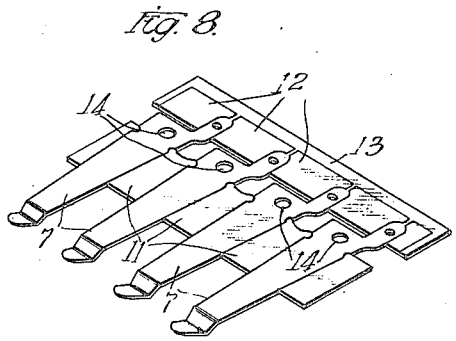
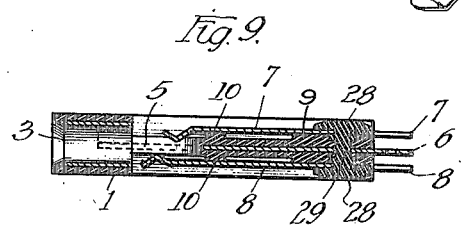
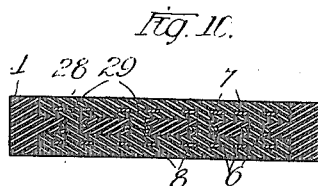
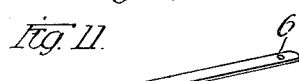
Witnesses:
Inventor
Frank B. Cook
By G. L. Bragg
Atty.

UNITED STATES PATENT OFFICE.

FRANK B. COOK, OF CHICAGO, ILLINOIS, ASSIGNOR TO FRANK B. COOK COMPANY, OF CHICAGO, ILLINOIS, A CORPORATION OF ILLINOIS.

PROCESS OF MAKING SPRING-JACKS.

1,161,193.            Specification of Letters Patent.      Patented Nov. 23, 1915.

Application filed January 15, 1915. Serial No. 2,423.

*To all whom it may concern:*

Be it known that I, FRANK B. COOK, citizen of the United States, residing at Chicago, in the county of Cook and State of Illinois, have invented a certain new and useful Improvement in Processes of Making Spring-Jacks, of which the following is a full, clear, concise, and exact description, reference being had to the accompanying drawings, forming a part of this specification.

My invention relates to the manufacture of spring jacks, such as, for example, are commonly used in telephone exchange practice, and has for its object the provision of an improved method of assembly of the component parts thereof.

In practising my invention, in one way, I employ a mounting strip which is provided with openings for the access of plugs to the spring jacks and locate this mounting strip in a molding machine, in which machine there are placed contacts which are to complete the spring jack structures. As I have practised the invention, it has been employed for mounting springs upon both sides of the mounting strip but the invention is not to be limited to this specific purpose. When the invention is practised for this purpose the molding machine is constructed and operated to form a spring holding strip on each side of the mounting strip, these two holding strips being integrally formed. The connecting portions between the holding strips are desirably in the form of bridge portions or rivet shanks which pass through openings in the springs and in the mounting strip therefor.

I do not wish to be limited to the employment of a mounting strip that initially includes plug receiving openings.

In forming the spring jacks in accordance with my present invention I desirably also employ the method broadly claimed in my prior application Serial No. 846,027, filed June 19, 1914.

I will explain my invention more fully by reference to the accompanying drawings showing the preferred method of practising the same and in which—

Figure 1 is a view in perspective of a mounting strip which is temporarily to form a part of the molding machine and which also happens to support conductors which lead to thimbles that surround the plug openings in the front of the mounting strip, though the invention is not to be limited to the mounting strip which initially carries conductors; Fig. 2 is a sectional view on line 2 2 of Fig. 1; Fig. 3 is a view illustrating the mounting strip of Figs. 1 and 2 in position within the molding machine of which such strip is temporarily to form a portion; Fig. 4 is a sectional view on line 4 4 of Fig. 3; Fig. 5 is a sectional view on line 5 5 of Fig. 3; Fig. 6 is a perspective view illustrating the complete structure; Fig. 7 is a sectional view on line 7 7 of Fig. 6; Fig. 8 is a perspective view showing the preferred arrangement of the springs when they are initially applied to their mounting strip while within the molding machine; Fig. 9 is a sectional view on line 9 9 of Fig. 6; Fig. 10 is a sectional view on line 10 10 of Fig. 9; and Fig. 11 is a perspective view of a structural feature.

Like parts are indicated by similar characters of reference throughout the different figures.

A strip 1 of insulation of a length corresponding to the number of spring jacks to be mounted is provided with a front rail 2 in which the thimbles 3 or other third jack contacts are disposed, the bores of the thimbles snugly receiving the forward continuation of the plug heel. The end portions of the strip 1 are desirably of the same height and are alined with the rail 2. The portion of the strip to the rear of the rail and between the ends thereof is preferably thinner than the rail and is desirably disposed intermediate the top and bottom planes of the rail. This intermediate portion of the strip is provided with recesses 5 which are alined with the axis of the thimbles 3, these recesses extending from the rail 2 sufficiently to the rear to receive plugs when inserted to the fullest extent within the corresponding jacks. The strip 1, in the process of manufacture, originally carries only the thimbles 3 and the conductors 6 extending rearwardly from these thimbles, the forward ends of the conductors 6 being of bifurcated or fork-shaped formation with branches that correspond generally in shape to the openings 5 and the forward ends of which branches are engaged to have extended soldered, brazed or welded connection with their thimbles as indicated in Fig. 7. Thus each thimble is interposed between and is electrically connected with the two forward branches of its conductors 6. All parts of each conductor 6, excepting its rear end, including its bifurcations and together with the thimbles 3 are preferably molded within the mounting strip 1 and its forward portion 2. The talking contact springs 7 and 8 are to be mounted upon the top and bottom sides of the strip 1 at the rear end thereof normally to rest upon projections 9, 10, the projections 9 being separated longitudinally of the strip as are the projections 10 to reduce leakage between springs of adjacent jacks, these projections or ridges 9 and 10 upon each side of the strip being also desirably separated widthwise of the strip to reduce the amount of insulating material required. Said projections are preferably integrally formed with the strip of insulating material 1 that carries them. The forward ridges or projections 10 also constitute back stops against which the springs 7 and 8 are forced by their own resilience and which limit the extent to which these springs may approach each other.

In order that the molding machine may be simplified in construction I desirably assemble the springs as indicated in Fig. 8 before they are placed in position upon the mounting strip 1 and to this end portions 11 and 12 of the waste in the strip material out of which the springs are formed are restored to association with the springs to act as spring holding chucks or spacers that also temporarily constitute portions of the molding machine to prevent the flow of molding material into the spaces between the forward and rear portions of adjacent springs, this feature of the present process being disclosed in my co-pending application Serial No. 846,027, filed June 19, 1914. A portion 13 of the waste is also retained for the purpose of further securing the assembly of the springs until after the molding operation. After the molding operation has been completed the portions 11, 12 and 13 are removed whereby the final product is one in which the springs 7 and 8 are all electrically distinct in the form of spring jacks shown.

After a group of shorter springs 7, initially interrelated as illustrated in Fig. 8, is placed with their openings 14 in alinement with the openings 15 in the mounting strip 1 (and incidentally the openings 16 in the conductors 6) and after a group of similarly related longer springs 8 is positioned in like manner upon the bottom side of the mounting strip 1, these assembled elements are clamped between the molding machine elements 17 and 18 which are supplemented by molding elements 19 and 20 for closing the rear of the structure against the outflow of the molding material. A down-setting portion 21 and a symmetrically arranged upwardly projecting portion 22 bear upon the groups of springs as arranged according to Fig. 8 throughout the length of the strip to coöperate with the springs and the waste portions 11 temporarily held between the same to prevent the molding material from being forced forwardly of the portions 21 and 22. In like manner the rear portions of the molding machine elements 17 and 18, in combination with the supplemental portions 19 and 20 and the waste portions 12 serve to prevent the rearward flow of molding material past the supplemental elements 19 and 20 and the parts of the molding elements 17 and 18 that engage the portions 19 and 20. When the parts are assembled as illustrated in Fig. 3 they are collectively placed within a holding cup 23 which serves to preserve the proper relation of the parts during the molding operation. The molding machine elements 17 and 18 are provided with openings 24 and 25 in which plungers 26 and 27 may be reciprocated, these openings being in alinement with the openings 14, 15 and 16. Measured portions of molding material are placed in the openings 24 and 25 to enable the plungers 26 and 27 to operate thereupon, these plungers being simultaneously moved toward each other to force this molding material through the openings 14, 15 and 16 and being shaped to form the molding material into the clamping strips 28 which are thus integrally formed by being connected by the bridge portions 29 that are integral with these strips 28. To prevent the strips from being influenced by the turning effort due to the spreading apart of the springs 7 and 8, the rear part of the mounting strip 1 is formed with rectangular channels 30 upon its top and bottom sides, the clamping strips being formed within these channels and projecting completely to overlie the ledges (exclusive of the projections $31^1$). After the plungers have been brought toward each other to produce the formation illustrated very clearly in Figs. 6, 9 and 10 the plungers are withdrawn, the parts are removed from the holder 23, and the molding elements 17, 18, 19 and 20 are separated whereafter the waste portions 11, 12 and 13 are removed to bring the product to its finished state.

While I have herein shown and particularly described one way of practising the method of my invention I do not wish to be limited thereto.

Having thus described my invention I claim as new and desire to secure by Letters Patent the following:—

1. The process of assembling component parts of a spring jack structure which consists in providing a mounting strip with plug receiving openings in their forward portions; placing jack springs upon said strip in their proper relation to the plug receiving openings; and molding a member in holding relation to said mounting strip and the springs placed thereupon.

2. The process of assembling component parts of a spring jack structure which consists in providing a mounting strip with plug receiving openings in their forward portions; placing jack springs upon opposite sides of said strip in their proper relation to the plug receiving openings; and molding holding strips upon both sides of the mounting strip to hold the springs in position and integrally forming these holding strips in the molding operation.

3. The process of assembling component parts of a spring jack structure which consists in providing a mounting strip with plug receiving openings in their forward portions and with openings for anchoring holding strips; placing jack springs upon opposite sides of said strip in their proper relation to plug openings; and molding holding strips upon both sides of the mounting strip to hold the spring in position and integrally forming these holding strips in the molding operation by the passage of molding material through the last aforesaid openings.

4. The process of assembling component parts of a spring jack structure which consists in providing a mounting strip with plug receiving openings in their forward portions; placing jack springs upon said strip in their proper relation to the plug receiving openings; and molding holding strips upon both sides of the mounting strip to hold the springs in position and integrally forming these holding strips in the molding operation.

5. The process of assembling component parts of a spring jack structure which consists in providing a mounting strip; placing jack springs in their proper relation upon said strip; and molding a member in holding relation to said mounting strip and the springs placed thereupon.

6. The process of assembling component parts of a spring jack structure which consists in providing a mounting strip; placing jack springs upon opposite sides of said strip in their proper relation; and molding holding strips upon both sides of the mounting strip to hold the springs in position and integrally forming these holding strips in the molding operation.

7. The process of assembling component parts of a spring jack structure which consists in providing a mounting strip with openings for anchoring holding strips; placing jack springs upon opposite sides of said strip in their proper relation; and molding holding strips upon both sides of the mounting strip to hold the springs in position and integrally forming these holding strips in the molding operation by the passage of molding material through the last aforesaid openings.

8. The process of assembling component parts of a spring jack structure which consists in providing a mounting strip; placing jack springs upon said strip in their proper relation; and molding holding strips upon both sides of the mounting strip to hold the springs in position and integrally forming these holding strips in the molding operation.

In witness whereof, I hereunto subscribe my name this ninth day of January, A. D., 1915.

FRANK B. COOK.

Witnesses:
G. L. CRAGG,
ETTA L. WHITE.